United States Patent
Shinoda et al.

(10) Patent No.: US 9,205,602 B2
(45) Date of Patent: Dec. 8, 2015

(54) METHOD FOR PRODUCING FIBER-REINFORCED PLASTIC

(75) Inventors: Tomoyuki Shinoda, Nagoya (JP); Nobuyuki Komatsu, Nagoya (JP); Hiroshi Odani, Nagoya (JP)

(73) Assignee: Toray Industries, Inc. (JP)

( * ) Notice: Subject to any disclaimer, the term of this patent is extended or adjusted under 35 U.S.C. 154(b) by 266 days.

(21) Appl. No.: 13/825,359

(22) PCT Filed: Sep. 21, 2011

(86) PCT No.: PCT/JP2011/071426
§ 371 (c)(1),
(2), (4) Date: Mar. 21, 2013

(87) PCT Pub. No.: WO2012/039409
PCT Pub. Date: Mar. 29, 2012

(65) Prior Publication Data
US 2013/0175740 A1   Jul. 11, 2013

(30) Foreign Application Priority Data

Sep. 24, 2010 (JP) ................................. 2010-213245
Mar. 4, 2011 (JP) ................................. 2011-047459

(51) Int. Cl.
*B29C 70/36* (2006.01)
*B29C 70/02* (2006.01)
(Continued)

(52) U.S. Cl.
CPC ............... *B29C 70/021* (2013.01); *B29C 43/20* (2013.01); *B29C 43/3642* (2013.01);
(Continued)

(58) Field of Classification Search
CPC .. B29C 70/021; B29C 70/547; B29C 70/443; B29C 43/20; B29C 43/3642
See application file for complete search history.

(56) References Cited

U.S. PATENT DOCUMENTS 4,548,859 A * 10/1985 Kline et al. ................... 442/312
4,622,091 A * 11/1986 Letterman ............. B29B 15/105
156/286

(Continued)

FOREIGN PATENT DOCUMENTS

JP    2004-181627 A    7/2004
JP    2004-188965 A    7/2004

(Continued)

OTHER PUBLICATIONS

Yang, J., et al., Mesoscopic simulation of the impregnating process of unidirectional fibrous preform in resin transfer molding, Materials Science and Engineering A, vol. 435-436 (2006), pp. 515-520.*

*Primary Examiner* — Matthew Daniels
(74) *Attorney, Agent, or Firm* — DLA Piper LLP (US)

(57) ABSTRACT

A method of producing fiber-reinforced plastic uses a molding die which includes a resin filling port at one end; a resin suction port at the other end; a laminate body of a plurality of laminated fiber-reinforced base materials and housed in the inner space of the molding die; a resin diffusion medium extending from the resin filling port and provided on opposite surfaces of the laminate body to supply resin onto opposite surfaces of the laminate body from the resin filling port; and a resin suction medium extending from the resin suction port and provided along a side surface of the laminate body on the suction port side to contact the side surface or to have a gap from the side surface, in a state that gas or resin can be suctioned from the laminate body so that the gas or resin can be moved from the laminate body toward the resin suction port.

11 Claims, 3 Drawing Sheets

(51) Int. Cl.
  *B29C 43/36* (2006.01)
  *B29C 70/44* (2006.01)
  *B29C 70/54* (2006.01)
  *B29C 43/20* (2006.01)
  *B29C 43/34* (2006.01)

(52) U.S. Cl.
  CPC .......... *B29C 70/443* (2013.01); *B29C 70/547* (2013.01); *B29C 43/34* (2013.01); *B29C 2043/3488* (2013.01); *B29C 2043/3644* (2013.01); *B29C 2043/3657* (2013.01)

(56) References Cited

U.S. PATENT DOCUMENTS

| | | | |
|---|---|---|---|
| 5,433,165 A | * | 7/1995 | McGuiness et al. ........... 114/357 |
| 6,478,913 B1 | * | 11/2002 | Dunleavy et al. ............. 156/153 |
| 2002/0020934 A1 | * | 2/2002 | Hinz ............................ 264/40.6 |
| 2006/0027314 A1 | * | 2/2006 | Jones et al. .................... 156/245 |
| 2009/0068428 A1 | * | 3/2009 | Shinoda ................. B29B 11/16 428/212 |
| 2010/0086765 A1 | * | 4/2010 | Inston ....................... 428/311.51 |
| 2010/0108245 A1 | * | 5/2010 | Nishiyama et al. ........... 156/243 |

FOREIGN PATENT DOCUMENTS

| | | |
|---|---|---|
| JP | 2005-527410 A | 9/2005 |
| JP | 2005-271248 A | 10/2005 |
| JP | 2006-130733 A | 5/2006 |
| JP | 2007-176163 | 7/2007 |
| JP | 2008-179149 | 8/2008 |
| JP | 2009-045924 | 3/2009 |
| JP | 4432563 B2 | 3/2010 |

* cited by examiner

Fig. 1

Prior Art

Fig. 2

Prior Art

METHOD FOR PRODUCING FIBER-REINFORCED PLASTIC

TECHNICAL FIELD

This disclosure relates to a method of producing a fiber-reinforced plastic. In particular, it relates to a method of producing a fiber-reinforced plastic that serves for easy manufacturing of a fiber-reinforced plastic having a large thickness from 10 to several tens of millimeters. A fiber-reinforced plastic is generally abbreviated as an FRP.

BACKGROUND

The available methods for a fiber-reinforced plastic production include an autoclave molding process in which a reinforcing fiber base material is first impregnated with a resin to produce a prepreg, followed by heating and pressing it in an autoclave to produce moldings, and a RTM (resin transfer molding) process in which a reinforcing fiber base material free from resin impregnation is fed into the inner space of a molding die comprising a top mold and a bottom mold, followed by maintaining compression of the molding die by using, for instance, an oil hydraulic press, injecting a compressed resin into the inner space, and heat-curing the resin to produce moldings.

Also available is a VaRTM (vacuum assisted resin transfer molding) process in which a bagging film is used instead of the top mold to allow the pressure in the inner space closed by the bagging film to be reduced by vacuum aspiration to cause a resin to be injected into a reinforcing fiber base material by the pressure difference from atmospheric pressure, followed by heat curing to provide moldings. This process has been widely used for production of a fiber-reinforced plastic because it does not require compression equipment such as oil hydraulic press as described above to permit low cost production of moldings.

Assuming that Darcy's law holds for a resin impregnation into a reinforcing fiber base material by processes such as RTM and VaRTM, the flow rate v (m/s) of a resin is expressed as follows:

$$v = -K \cdot \nabla P / \mu \quad (1)$$

where K (m) denotes permeability, an index representing the easiness of impregnation into the reinforcing fiber base material with the resin, P (Pa) denotes the pressure of the resin, and μ (Pa·s) denotes the viscosity of the resin.

In this formula, ∇P represents the pressure gradient. As the value of permeability K (m) increases, it becomes easier to impregnate the reinforcing fiber base material with the resin.

It is seen that the impregnation distance of the resin is proportional to the permeability K (m) of the reinforcing fiber base material used and the pressure P (Pa) of the resin and inversely proportional to the viscosity μ (Pa·s) of the resin.

Accordingly, impregnation of a thick reinforcing fiber base material with a resin requires an increased resin injection pressure P (Pa) or a decreased resin viscosity. There is a limit, however, to reduction in resin viscosity, and it is actually necessary to increase the resin injection pressure P (Pa).

To maintain a high resin injection pressure P (Pa), it is necessary to perform compression by using a pressure device such as oil hydraulic press that can maintain a required inner space in a molding die that would not open while a resin is injected into the inner space.

On the other hand, the VaRTM process, which is performed under atmospheric pressure and requires no compression equipment, conventionally has the disadvantage that the resin impregnation thickness is limited because the resin injection pressure is restricted by atmospheric pressure (JP 2007-176163 A). To solve this problem, a process has been proposed in which a resin diffusion medium or resin passage is provide on both sides of a layered body (a layered body comprising a stack of a plurality of reinforcing fiber base materials) and a resin is injected into the layered body through both surfaces of the layered body so that the layered body can impregnated to an increased thickness (depth) with the resin (JP 2004-188965 A and JP 2008-179149 A).

However, both JP '965 and JP '149 fail to disclose a method of preventing the resin injected through the resin diffusion medium or resin passage from being discharged through a resin suction port (vacuum aspiration port) after taking short cuts instead of serving to impregnate the reinforcing fiber base materials. Thus, the processes have a problem of discharge of resin through a resin suction port before impregnating the reinforcing fiber base materials and also have a problem of unimpregnated portions being left in the reinforcing fiber base materials.

In addition, both JP '965 and JP '149 fail to disclose a method of preventing voids from being confined in the resin that is injected through both surfaces of the layered body into the inner part of the layered body. This results in a problem of confinement of voids in fiber-reinforced plastic moldings.

For the VaRTM process, JP 4432563 B describes a method of eliminating formation of resin-unimpregnated portions in reinforcing fiber base materials by preventing formation of shortcuts to the resin suction port. However, it deals only with injection of a resin from one side of a layered body and has no description about resin injection from both sides of a layered body which is necessary to impregnate thick reinforcing fiber base materials with a resin. If applied to the thick reinforcing fiber base materials, therefore, that method has a problem of an inability to impregnate the thick reinforcing fiber base materials with a resin, leading to unimpregnated portions left in the reinforcing fiber base materials.

It could therefore be helpful to provide a method of producing a fiber-reinforced plastic by RTM or VaRTM that can inject a resin into reinforcing fiber base materials, particularly a thick one having a thickness of 10 mm or more, without leaving resin-unimpregnated portions and depress the formation of voids in the reinforcing fiber base materials.

It could also be helpful to provide a method of producing a fiber-reinforced plastic that produces a fiber-reinforced plastic by VaRTM at minimized cost by eliminating the use of large pressing equipment such as oil hydraulic press, injecting resin into reinforcing fiber base materials without leaving unimpregnated portions, and preventing formation of voids in the reinforcing fiber base materials so that equipment cost is largely reduced as compared with the RTM process that uses a molding die comprising a top mold and a bottom mold and compression equipment such as oil hydraulic press.

There is further a need to provide a method of producing a fiber-reinforced plastic in which even when applied to the RTM process, which uses a molding die comprising a top mold and a bottom mold and compression equipment such as oil hydraulic press, thick reinforcing fiber base materials can be impregnated under a smaller pressure without leaving unimpregnated portions, thereby making it possible to use a simplified die and smaller size compression equipment, reduce the required equipment cost, and provide fiber-reinforced plastics at minimized prices.

Although the conventional method including a step of disposing a resin diffusion medium on both sides of a layered body and a step of injecting a resin from both sides into the layered body to impregnate it is an effective means of impregnating a thick layered body with resin, the conventional two side impregnation process lacks a means of preventing formation of shortcuts that lead the resin to a resin suction port and, consequently, the resin tends to take shortcuts to a resin suction port lower in flow path resistance instead of penetrating in the thickness direction into thick reinforcing fiber base materials that are higher in flow path resistance, leading to the problem of formation of resin-unimpregnated portions in the layered body. Even if a step of injecting a resin from both sides of a layered body is added, the process still has a problem of confinement of voids between resin layers, resulting in voids remaining in a molded fiber-reinforced plastic.

Thus, there is a need to provide a method of producing a fiber-reinforced plastic that performs resin impregnation of a thick layered body while preventing the formation of shortcut resin flow paths to a resin suction port (vacuum aspiration port) to depress the formation of resin-unimpregnated portions and at the same time depressing formation of voids in the layered body during the injection of the resin and the impregnation of the layered body.

SUMMARY

We thus provide:

A method for producing a fiber-reinforced plastic comprising the steps of:

(a) preparing a molding die having a resin filling port at one end thereof and a resin suction port at the other end thereof, (b) setting a layered body composed of a stack of a plurality of reinforcing fiber base materials in the inner space of the molding die, (c) setting a resin diffusion medium which extends from the resin filling port and is provided along two mutually opposed surfaces of the layered body to supply a resin from the resin filling port to the two mutually opposed surfaces of the layered body, (d) setting a resin suction medium which extends from the resin suction port and is provided along a side face of the layered body on the suction port side to be in contact with the side face or to have a gap from the side face, in a state that gas or resin can be sucked from the layered body so that the gas or resin can be moved from the layered body toward the resin suction port, (e) sucking gas in the inner space of the molding die from the suction port through the resin suction medium to reduce the pressure in the inner space of the molding die, (f) subsequently filling the resin into the layered body from the resin filling port through the resin diffusion medium, and (g) impregnating the layered body with the resin by moving a part of the resin filled into the layered body toward the resin suction port through the resin suction medium.

It is preferable that the resin suction medium faces on a side face of the layered body that includes reinforcing fiber base materials located at a confluence region of flows of the resin impregnating into the layered body from the two mutually opposed surfaces of the layered body.

It is preferable that the resin suction medium faces on a side face of the layered body that includes reinforcing fiber base materials located at the thickness center portion of the layered body.

It is preferable that the resin suction medium is fixed to the molding die with a sealing-fixing material at a position between the inner face of the molding die and the side face of the layered body.

It is preferable that the sealing-fixing material has a height nearly equal to the thickness of the layered body and has a resin aspiration port having a height of 0.1 to 5 mm and a width of 0.1 to 50 mm at a position corresponding to the thickness center portion of the layered body.

It is preferable that the resin diffusion medium extending from the resin filling port does not reach the position of the side face of the layered body in which the resin suction medium is provided so that a region free from the resin diffusion medium is formed between the inner face of the molding die and the surface of the layered body.

It is preferable that the resin suction medium has a portion located outside a region through which the resin is sucked and the portion is covered with an airtight material to protect against suction of the resin.

It is preferable that the resin flow resistance of the resin diffusion medium is $\frac{1}{10}$ or less than $\frac{1}{10}$ of the resin flow resistance of the reinforcing fiber base materials.

It is preferable that the resin flow resistance of the resin suction medium is $\frac{1}{3}$ or less than $\frac{1}{3}$ of the resin flow resistance of the reinforcing fiber base materials.

An end of the resin suction medium may be inserted between the reinforcing fiber base materials in the layered body.

At least a part of the resin suction medium may be removed from a molded fiber-reinforced plastic.

At least a part of the resin suction medium may be left in the layered body.

The reinforcing fiber base materials forming the layered body may comprise reinforcing fibers which are arranged in the same direction.

EXPLANATION OF REFERENCE NUMBERS

1: bottom mold of a molding die
2: resin filling port
3: bottom face side resin diffusion medium (resin diffusion medium (bottom))
5: top face side resin diffusion medium (resin diffusion medium (top))
4: layered body
6: resin suction port (vacuum aspiration port)
7, 7a, 7b, 7c: resin suction medium 8: bagging film
9, 9a, 9b: sealer
10, 11, 12, 13, 14, 15: arrow
16: sealing-fixing material
17: airtight material
M1, M2, M3: molding die
PM1: molding die
SW: side wall formed by the thickness of the layered body at a position opposite to the resin filling port
X: portion (region) of the resin suction medium in direct contact with the side wall (side face) formed by the thickness of the layered body
Y: portion free from resin diffusion medium

DETAILED DESCRIPTION

As described above, as compared with a process based on a step of impregnating a layered body by filling a resin from only one side, the process based on a step of impregnating a layered body by filling a resin from both sides works not only to greatly improve the resin-impregnated thickness, but also to depress formation of resin-unimpregnated portions resulting from shortcuts of resin flow because after the resin is filled in the layered body in its thickness direction from the resin filling port toward the resin suction port to impregnate the layered body, the resin suction medium provided on the side wall (side face) of the thickness of the layered body allows the resin filled into the layered body in its thickness direction to be sucked by the resin suction medium.

Furthermore, since the resin suction medium is located along the side face of the layered body, it will be very easy for the resin suction medium to be peeled off and removed from a molded fiber-reinforced plastic.

If the resin suction medium is located such that it is in contact with the side face formed by the thickness of the layered body to allow the inside of the molding die to be vacuum-aspirated through the resin suction medium, the reinforcing fiber base materials forming the layered body will be vacuum-aspirated in the interlayer direction.

As resin supplied to the resin diffusion medium diffuses while impregnating the layered body, a pressure difference will be caused according to distribution of the resin in the thickness direction of the layered body, making it possible to control resin filling impregnation of the layered body in its thickness direction. This can significantly depress formation of shortcuts of resin flows toward the resin suction port (vacuum aspiration port), and resin-impregnation of a thick layered body can be performed while significantly depressing formation of resin-unimpregnated portions.

Such resin diffusion medium and resin suction medium themselves are conventionally known materials. There are no specific limitations on the resin diffusion medium and resin suction medium to be used as long as they are of such a structure and material for efficient diffusion and suction of resin. Appropriate ones may be selected taking into consideration the reinforcing fiber base materials and resin to be used for molding as well as the molding conditions to be adopted.

These mediums may be in the form of a mesh fabric, punched material, or nonwoven fabric. In particular, the use of a medium having a mesh structure with an aperture size of about 2 to 10 mm is preferred because of their ability for efficient resin diffusion and suction. Mediums having an aperture size of less than 2 mm tend to be small in ability for resin diffusion and suction, while those exceeding 10 mm tend to allow a bagging film located along the resin diffusion medium to get in the network structure to fill the space of mesh apertures.

It is preferable that the resin diffusion medium and the resin suction medium are formed of a resin such as polyamide and polyester or a metal such as stainless steel. There are no specific limitations on the materials as long as they have resistance to flowing resin, heat resistance to the molding temperature, and pressure resistance to the molding pressure.

It is preferable that the resin diffusion medium and the resin suction medium are in the form of a sheet having a thickness of 0.5 to 2 mm. Sheets having a thickness of less than 0.5 mm tend to be small in ability for resin diffusion and suction, while those exceeding 2 mm tend to allow an excessive quantity of resin to pass through the resin diffusion medium, resulting in a decrease in the quantity of resin (resin yield) to effectively mold the layered body.

It is preferable that such a bagging film is formed of a resin such as polyamide and polyester and has a thickness of about 50 to 100 μm. There are no specific limitations on the resin as long as it has resistance to a resin to be filled in the mold, heat resistance to the molding temperature, and pressure resistance to the molding pressure.

The resin suction medium is provided along the side face (side wall surface) formed by the thickness of the layered body, in contact with the side face, or with a gap to the side face such that it allows aspiration of gas or resin from the layered body.

It is preferable that the resin suction medium faces a side face of the layered body that includes reinforcing fiber base materials located at a confluence of flows of the resin filling into the layered body from the top and bottom surfaces of the layered body. The resin suction medium disposed in such a manner is shown as portion X in FIG. 3 described later. A resin is filled into the layered body through the resin diffusion medium provided on the top and bottom surfaces of the layered body, and impregnates the layered body in its thickness direction from the top and bottom surfaces of the layered body, and the flows of the resin join together in the layered body as they impregnate it. Then, after the completion of resin impregnation in the thickness direction, the resin is aspirated by a resin suction medium provided to face a side face of the layered body that includes the interlayer space between reinforcing fiber base materials located at the confluence where flows of the resin join together after working for impregnation. This increases the resin-impregnated thickness in the layered body and depresses formation of resin-unimpregnated portions in the layered body.

In the case of a layered body formed of reinforcing fiber base materials of the same material and having a vertically symmetric layer structure, flows of the resin filled from the top and bottom surfaces of the layered body to impregnate it move from the top and bottom surfaces toward the through-thickness center of the layered body as they impregnate it and join together at the through-thickness center of the layered body.

Accordingly, in the case of a layered body formed of reinforcing fiber base materials of the same material, in particular, a resin suction medium provided along a side face of the layered body to contain the through-thickness center region of the layered body can serve to increase the resin-impregnated thickness in the layered body and depress formation of resin-unimpregnated portions in the layered body, because flows of the resin, which is filled through a resin diffusion medium provided on the top and bottom surfaces of the layered body, impregnate the layered body in its thickness direction from the top and bottom surfaces and finally reaches the resin suction medium after the flows of impregnation resin join together to complete resin impregnation in the thickness direction.

It is preferable that a sealing-fixing material having an opening in the through-thick-ness center region of the layered body is provided between the resin suction medium and the side face formed by the thickness of the layered body so that it extends along the side face formed by the thickness of the layered body such that the resin suction medium is fixed by the sealing-fixing material. It is preferable that the Shore A hardness of the sealing-fixing material is HS50 or lower. Such a low Shore A hardness ensures a sufficiently high airtightness between the sealing-fixing material and the layered body, serving to prevent formation of resin flow shortcuts.

It is preferable that the sealing-fixing material has a slit-like resin aspiration port having a height of 0.1 to 5 mm at a position corresponding to the through-thickness center region of the layered body. It is also preferable that this resin aspiration port provided in the sealing-fixing material has a width of 0.1 to 50 mm. A resin aspiration port of this size provided in the sealing-fixing material will not suffer from significant deformation. It is preferable that the height of the sealing-fixing material stated above is virtually equal to the thickness of the layered body from the viewpoint of preventing outflow of the resin from portions of the layered body other than the resin aspiration port and maximizing the length of contact between the sealing-fixing material and the side face of the layered body. This is because the space between the sealing-fixing material and the side face of the layered body is not sealed completely although there is no gap left between them, making it necessary to prevent part of the resin from entering between the sealing-fixing material and the side face of the layered body and gradually moving toward the resin aspiration port.

It is preferable that the sealing-fixing material is made of silicone rubber having high releasability from the resin. This depresses deformation of the sealer during vacuum aspiration, improves position accuracy of resin flow channels, and more effectively depresses the formation of resin-unimpregnated portions in the layered body to increase the resin-impregnated thickness in the layered body.

It is preferable that on a face of the layered body where the resin diffusion medium is provided, the resin diffusion medium extending from the resin filling port does not reach a part of the side face of the layered body covered by the resin suction medium, leaving a region free from the resin diffusion medium, i.e., the portion Y where the resin diffusion medium does not exist (the portion Y defined in FIG. 3 described later), between the inner face of the die and the surface of the layered body.

Provision of such a portion Y free from a resin diffusion medium allows the resin to gradually diffuse in the in-plane direction (a direction virtually perpendicular to the thickness direction) at those positions in the layered body corresponding to the portion free from the resin diffusion medium while impregnating the layered body in the thickness direction at those positions corresponding to the portion provided with the resin diffusion medium. Subsequently, aspiration of resin by the resin suction medium starts only after the resin has impregnated those internal portions of the layered body that correspond to the portion free from the resin diffusion medium. Accordingly, the duration from the start of resin filling to the start of aspiration by the resin suction medium can be controlled by adjusting the length of the portion Y free from a resin diffusion medium.

To be more specific, even if the layered body has been completely impregnated in the thickness direction with the resin in the portion provided with the resin diffusion medium, aspiration of the resin by the resin suction medium will not start immediately if the portion Y free from the resin diffusion medium has not been impregnated with the resin. In particular, even if unexpected formation of resin unimpregnated portions takes place during resin filling and impregnation, existence of the portion Y free from the resin diffusion medium ensures an adequate duration until the start of resin aspiration, allowing the resin to impregnate the unimpregnated portions before the start of its aspiration by the resin suction medium.

It is preferable that the portion Y free from the resin diffusion medium has a length of 1 to 30 mm in the length direction of the bottom mold. If the length is less than 1 mm, the effect described above can be hardly expected. If the length exceeds 30 mm, on the other hand, a resin-unimpregnated portion may be formed at a position corresponding to the portion Y free from the resin diffusion medium. It is furthermore preferable that the portion Y has a nearly constant width across the entire width of the layered body (in the direction perpendicular to the paper containing cross sections in FIGS. 1 to 7 described later).

It is also preferable that the resin suction medium is provided along the side face formed by the thickness of the layered body and covered with airtight material except for the part through which resin is aspirated out of the layered body. Even if the resin diffusing through the resin diffusion medium unexpectedly reaches the resin suction medium connecting to the resin suction port (vacuum aspiration port), provision of airtight material on some portions of the resin suction medium will allow the airtight material to prevent the resin from being aspirated to the resin suction medium and depress formation of shortcuts.

The airtight material may be the same as that of the bagging film, but there are no specific limitations.

To make these preventive methods more effective, it is more preferable that the airtight material is provided at least on both sides of the resin suction medium. Provision of airtight material on both sides of the resin suction medium prevents formation of shortcuts through which the resin diffusing from the resin diffusion medium provided on both sides of the layered body could reach the resin suction medium.

As a result, aspiration of resin by the resin suction medium starts only after completion of impregnation progressing from the resin diffusion medium in the thickness direction of the layered body, ensuring a maximum degree of impregnation under given resin filling conditions.

The resin flow resistance of the resin diffusion medium is preferably as low as possible, and more preferably it should be ¹⁄₁₀ or less of the resin flow resistance of the reinforcing fiber base materials. Such a low flow resistance ensures that the resin filled to the resin diffusion medium will diffuse adequately in the in-plane direction of the reinforcing fiber base materials, and the resin filled in the resin diffusion medium will rapidly diffuse in the thickness direction of the reinforcing fiber base materials while also diffusing rapidly in the direction along the surface of the reinforcing fiber base materials.

On the other hand, it is preferable that the resin flow resistance of the resin suction medium is ⅓ or less of the resin flow resistance of the reinforcing fiber base materials. It is preferable that resin flow mediums such as resin diffusion medium and resin suction medium has a sufficiently low resin flow resistance as compared to the air flow resistance of the reinforcing fiber base materials, because it prevents a decrease in the degree of vacuum inside the layered body, thereby ensuring good resin impregnation of a thick layered body.

It is preferable that the resin suction medium is removed from a molded fiber-reinforced plastic. In many cases, the resin diffusion medium is removed because it is not an essential component of a fiber-reinforced plastic. The resin suction medium can also be removed easily by peeling after molding if it is in contact with a side face formed by the thickness of the layered body with a peel ply or the like for peeling provided between it and the layered body. This eliminates the necessity of post-processing such as cutting and shortening of the production time can be expected. Thus, production of larger size moldings is preferable because the above effect is enhanced accordingly.

It is preferable that part of an end of the resin suction medium provided such that it is in contact with a side face formed by the thickness of the layered body is inserted between reinforcing fiber base materials that constitute the layered body.

If the resin suction medium is provided such that its end is inserted between layers of the reinforcing fiber base materials to allow vacuum aspiration inside the molding die via the resin suction medium, it will be possible to perform direct vacuum aspiration via the resin suction medium in the thickness direction of the layered body. In this configuration, as the resin diffuses after being supplied to the resin diffusion medium, a pressure difference will be caused in the resin in the thickness direction of the layered body, making it possible to control the resin injection and impregnation in the thickness direction of the layered body. Consequently, this can significantly depress formation of shortcuts of resin flows toward the resin suction port (vacuum aspiration port), making it possible to resin-impregnate a thick layered body without causing formation of resin-unimpregnated portions.

In this case, however, the resin is cured for molding with an end of the resin suction medium inserted between layers of the reinforcing fiber base materials that constitute the layered body, leading to a problem with a part of the resin suction medium remaining in a molded fiber-reinforced plastic. The configuration with an end of the resin suction medium inserted between the layers can be applied in cases where no problem will be caused if the part of the resin diffusion medium remains in the fiber-reinforced plastic or where the resin diffusion medium is removed by a cutting or similar step after molding.

It is preferable that the layered body is formed of the reinforcing fiber base materials in which reinforcing fibers are oriented only in one direction because significant effect can be expected in that case. If the layered body is formed of the reinforcing fiber base materials in which reinforcing fibers are oriented only in one direction, the reinforcing fibers can be aligned more densely as compared to a layered body formed of stacked reinforcing fiber base materials each containing reinforcing fibers oriented in one direction, but in a different direction from those in the others (for example, a $[45°/0°/-45°/90°]_S$ layered body formed of eight layers consisting of two sets of four layers stacked symmetrically in the thickness direction). However, the degree of impregnation of the layered body with resin tends to decrease due to trade-offs.

Conventionally, this has been a serious limitation on the resin-impregnatable thickness. Compared to this, the use of our method can significantly enhance the effect of efficient resin impregnation without formation of resin-unimpregnated portions even if the layered body is formed of reinforcing fibers oriented in only one direction and, therefore, a layered body formed of reinforcing fiber base materials in which reinforcing fibers are oriented only in one direction is used preferably to carry out our method.

Our method of producing a fiber-reinforced plastic can impregnate a layered body particularly having a thickness of 10 mm or more without formation of resin-unimpregnated portions and also depresses formation of voids in the layered body.

In particular, it produces moldings by VaRTM at minimized cost by eliminating the use of large pressing equipment such as oil hydraulic press, impregnating a thick layered body with resin without leaving unimpregnated portions, and preventing formation of voids in the layered body so that equipment cost is largely reduced as compared with the RTM process that uses a conventional two-mold type die and compression equipment such as oil hydraulic press.

Even when using a two-mold type die and compression equipment such as oil hydraulic press such as in the case of the RTM process, it can impregnate a thick layered body under a smaller pressure without leaving unimpregnated portions, make it possible to use a simplified molding die and smaller size compression equipment, reduce the required equipment cost, and provide moldings at low prices.

Our methods can largely depress formation of shortcuts of resin flows toward the resin suction port (vacuum aspiration port) so that a thick layered body can be impregnated with resin without causing the formation of resin-unimpregnated portions and also serve to depress the formation of voids in the layered body.

Turning now to the Drawings, a fiber-reinforced plastic production method using a conventional RTM process is described below with reference to FIGS. 1 and 2.

Figure 1:
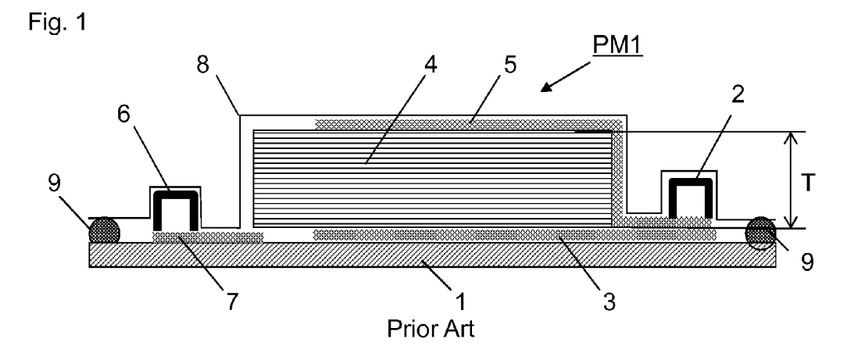
FIG. 1 is a schematic vertical section diagram of a conventional molding die designed for a fiber-reinforced plastic production by the RTM process.

FIG. 1 is a schematic vertical section diagram of a molding die PM1 designed for a fiber-reinforced plastic production by a conventional RTM process. In FIG. 1, the molding die PM1 has a bottom mold 1 of the molding die PM1 at the base thereof. A layered body 4 comprising a plurality of stacked reinforcing fiber base materials is placed on the inner side (upper side in the figure) of the bottom mold 1. In FIG. 1, a resin filling port 2 is provided at a position between the right edge of the layered body 4 and the right edge of the bottom mold 1 and, in FIG. 1, a resin suction port (vacuum aspiration port) 6 is provided at a position between the left edge of the layered body 4 and the left edge of the bottom mold 1.

A bagging film 8 is placed above the bottom mold 1 to cover the layered body 4, the resin filling port 2, and the resin suction port 6. The bagging film 8 acts as a top mold of the molding die PM1. The inner face of the bottom mold 1 and the inner face of the bagging film (the top mold) 8 define the internal space of the molding die PM1 formed between them. A sealer 9 is provided between the peripheral edge of the inner face of the bottom mold 1 and the peripheral edge of the inner face of the bagging film 8. The internal space of the molding die PM1 is isolated from the exterior space by the sealer 9.

In the molding die PM1, a bottom face side resin diffusion medium (resin diffusion medium (bottom)) 3 connecting to the resin filling port 2 is provided between the inner face (top face) of the bottom mold 1 and the bottom face of the layered body 4, while a top face side resin diffusion medium (resin diffusion medium (top)) 5 connecting to the resin filling port 2 is provided between the inner face of the bagging film 8 and the top face of the layered body 4. Furthermore, a resin suction medium 7 connecting to the resin suction port 6 is provided between the inner face (top face) of the bottom mold 1 and the bottom face of the layered body 4 along the inner face (top face) of the bottom mold 1.

In the molding die PM1, the layered body 4 is located in the closed space enclosed by the bottom mold 1, the bagging film 8, and the sealer 9.

Resin injection into the layered body 4 in the molding die PM1 is effected by aspirating gas out of the interior of the molding die PM1 via the resin suction port 6 by using a tool such as vacuum pump so that the pressure in the interior of the molding die PM1 is reduced through the resin suction medium 7, thereby allowing a resin to be injected from the resin filling port 2 into the layered body 4 through the bottom face side resin diffusion medium 3 and the top face side resin diffusion medium 5.

Figure 2:
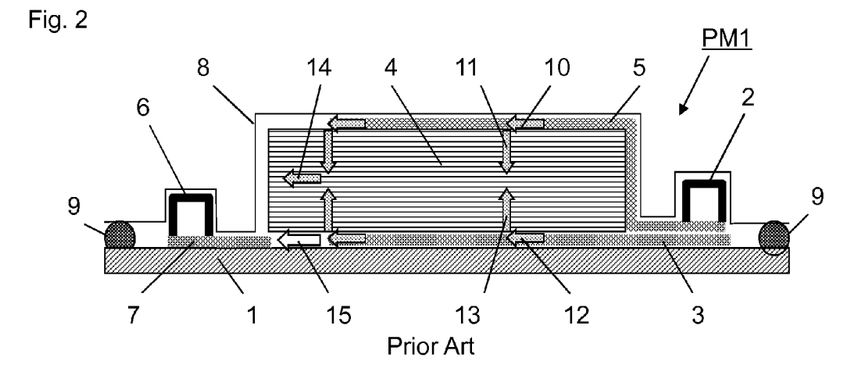
FIG. 2 is a schematic diagram outlining the step of injection of resin to impregnate a layered body in the molding die shown in FIG. 1.

FIG. 2 is a schematic diagram outlining the step of injection of resin to impregnate the layered body in the molding die PM1 shown in FIG. 1. In FIG. 2, the resin injected diffuses along the top face side resin diffusion medium 5 in the portion where the top face side resin diffusion medium 5 is provided as indicated by an arrow 10, and it also diffuses along the bottom face side resin diffusion medium 3 in the portion where the bottom face side resin diffusion medium 5 is provided as indicated by an arrow 12. The resin impregnates the layered body 4 as it diffuses in the thickness direction of the layered body 4, i.e., from the top face and the bottom face into inner portions of the layered body 4, as indicated by an arrow 11 and an arrow 13.

In the portions where the bottom face side resin diffusion medium 3 and the top face side resin diffusion medium 5 are not provided, that is, the space portion between the top face of the bottom mold 1 and the bottom face of the layered body 4 and the space portion between the inner face of the bagging film 8 and the top face of the layered body 4, the resin diffusion medium is absent, and supply of the resin into the layered body 4 through the resin diffusion medium does not take place. Accordingly, in the portion free from the resin diffusion medium, only the resin that has penetrated into the interior of the layered body 4 can move in the in-plane direction between the reinforcing fiber base materials that constitute the layered body 4. In FIG. 2, this flow is schematically illustrated by an arrow 14.

In FIG. 2, however, the resin suction medium 7 is not in contact with the reinforcing fiber base materials in the layered body 4 or with the surface of the side edge (side face) of the layered body 4, as suggested by the space portion between the left edge face of the layered body 4 and the inner face of the bagging film 8. Consequently, the resin passing through the shortcut resin flow channel denoted by an arrow 15 reaches the resin suction medium 7 provided along the inner face (top face) of the top mold 1 in a shorter time than the resin passing through the flow channel denoted by the arrow 14.

This means that in the portions free from the bottom face side resin diffusion medium 3 and the top face side resin diffusion medium 5, the resin passing through the shortcut path denoted by the arrow 15 is aspirated by the resin suction medium 7 earlier than the completion of the resin impregnation of the layered body 4 in its thickness direction. This results in the conventional problem of formation of resin-unimpregnated portions inside the layered body 4.

Next, our method of producing a fiber-reinforced plastic is described below with reference to FIGS. 3 and 4.

Figure 3:
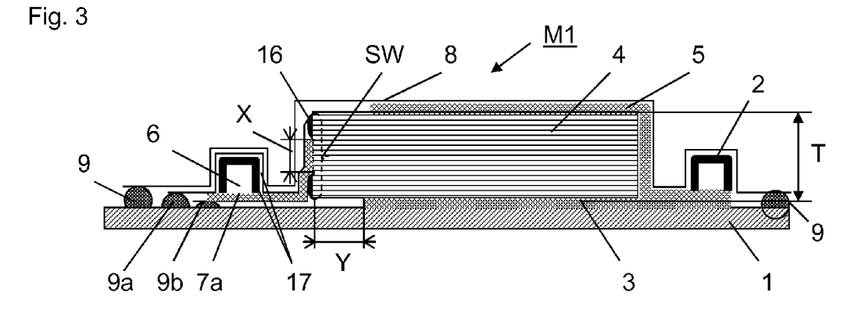
FIG. 3 is a schematic vertical section diagram of an example of the molding die for practicing our method of producing a fiber-reinforced plastic using an RTM process.

FIG. 3 is a schematic vertical section diagram of a molding die M1, which is an example molding die designed to carry out our RTM-based fiber-reinforced plastic production method. In FIG. 3, the members common to FIG. 1 have the same numbers.

In FIG. 3, the molding die M1 has a resin filling port 2 at an end thereof and a resin suction port (vacuum aspiration port) 6 at the other end thereof. The interior space of the molding die M1 contains a layered body 4 including a plurality of stacked reinforcing fiber base materials. Resin diffusion mediums 3 and 5 are provided such that they extend from the resin filling port 2 along the two opposed faces of the layered body 4 (the top face and the bottom face of the layered body 4 in the figure). A resin is supplied from the resin filling port 2 to the two opposed faces of the layered body 4 through the resin diffusion medium layers 3 and 5.

A resin suction medium 7a is provided such that it extends from the resin suction port 6 along a side face of the layered body near the resin suction port 6 in contact with the side face or with a gap to the side face to allow aspiration of gas or resin from the layered body. The gas or resin aspirated out of the layered body 4 moves through the resin suction medium 7a toward the resin suction port 6.

In the molding die M1, the gas in the interior space of the molding die M1 is aspirated from the resin suction port 6 through the resin suction medium 7a to reduce the pressure in the interior space of the molding die M1 and, subsequently, the resin is injected into the layered body 4 from a resin filling port 2 through the resin diffusion mediums 3 and 5 to allow a part of the resin injected into the layered body 4 to move through the resin suction medium 7a toward the resin suction port 6, thereby effecting impregnation of the layered body 4 with the resin. Then, the resin injected into the layered body 4 solidifies to provide a fiber-reinforced plastic. The resulting fiber-reinforced plastic is removed out of the molding die M1 and used as a molded product as obtained or after finishing.

Specifically, the molding die M1 in FIG. 3 has a bottom mold 1 of the molding die M1 at its bottom. The layered body 4 including the plurality of stacked reinforcing fiber base materials is placed on the inner side (upper side in FIG. 3) of the bottom mold 1. In FIG. 3, the resin filling port 2 is provided at a position between the right edge of the layered body 4 and the right edge of the bottom mold 1 and, in FIG. 3, the resin suction port (vacuum aspiration port) 6 is provided at a position between the left edge of the layered body 4 and the left edge of the bottom mold 1.

A bagging film 8 is placed above the bottom mold 1 to cover the layered body 4, the resin filling port 2, and the resin suction port 6. The bagging film 8 acts as top mold of the molding die M1. The inner face of the bottom mold 1 and the inner face of the bagging film (top force) 8 define the internal space of the molding die M1 formed between them. A sealer 9 is provided between the top face of the peripheral edge of the inner face of the bottom mold 1 and the peripheral edge of the inner face of the bagging film 8.

In the molding die M1, the bottom face side resin diffusion medium (resin diffusion medium (bottom)) 3 connecting to the resin filling port 2 is provided between the inner face (top face) of the bottom mold 1 and the bottom face of the layered body 4, while the top face side resin diffusion medium (resin diffusion medium (top)) 5 connecting to the resin filling port 2 is provided between the inner face of the bagging film 8 and the top face of the layered body 4.

Furthermore, the resin suction medium 7a connecting to the resin suction port 6 is provided between the inner face (top face) of the bottom mold 1 and the inner face of the bagging film 8. That portion of the resin suction medium 7a which includes the opposite end to the end near the resin suction port 6 extends upwardly along the side face of the layered body 4 (the surface of the left side wall SW in FIG. 3) located opposite to the other side face of the layered body 4 (the right side face in FIG. 3) near the position of the resin filling port 2 such that it faces the side face of the layered body 4 or comes in contact with the side face of the layered body, if required, between the side face of the layered body 4 and the inner face of the bagging film 8 and at least in a region of the side face of the layered body 4 to allow aspiration of resin out of the layered body 4.

In the molding die M1, the layered body 4 is located in the closed space enclosed by the bottom mold 1, the bagging film 8, and the sealer 9.

A resin injection into the layered body 4 in the molding die M1 is effected by aspirating gas out of the interior of the molding die M1 via the resin suction port 6 by using a tool such as a vacuum pump so that pressure in the interior of the molding die M1 is reduced through the resin suction medium 7a, thereby allowing the resin to be injected from the resin filing port 2 into the layered body 4 through the bottom face side resin diffusion medium 3 and the top face side resin diffusion medium 5.

It is preferable that in the molding die M1, the resin suction medium 7a is provided over the entire length of the side face formed by the thickness of the layered body 4 to cover the through-thickness center region of the layered body 4. It is furthermore preferable that the resin suction medium 7a is provided with a sealing-fixing material 16 at above and below an aspiration site in the central portion of the side face formed by the thickness of the layered body 4, that is, above and below a region X shown in FIG. 3. It is also preferable that the resin suction medium 7a including both surfaces and side faces, but excluding the aspiration site is covered with an airtight material 17.

The sealing-fixing material 16 to be used may be an elastic sealer such as adhesive tape and sealant, but the use of silicone rubber is preferable from the viewpoint of increasing the shape stability after vacuum aspiration and increasing the releasability after molding.

It is preferable that the sealing-fixing material 16 is provided between the resin suction medium 7a and the side face formed by the thickness of the layered body 4 such that it does not seal the portion that corresponds to the through-thickness center region of the layered body and that it has a length equal to the thickness of the layered body and also has a slit-like resin aspiration port having a height of 0.1 to 5 mm and a width of 0.1 to 50 mm in the central region to leave an unsealed portion.

Figure 4:
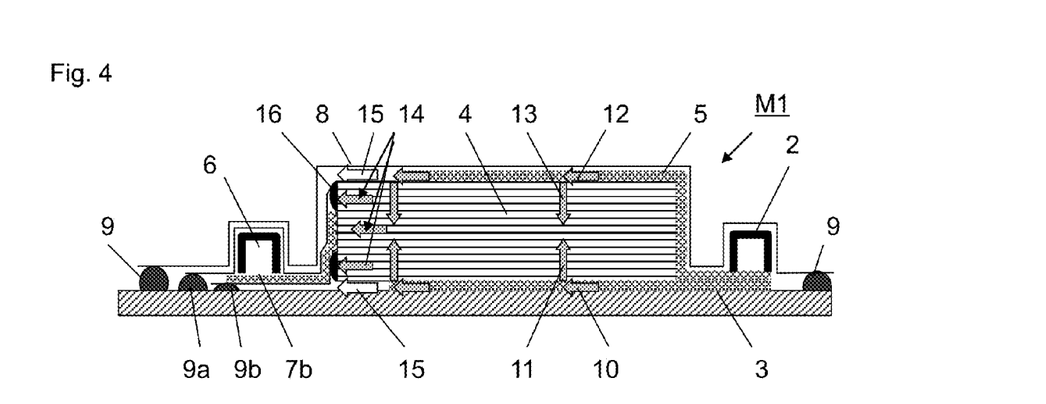
FIG. 4 is a schematic diagram outlining the step of injection of resin to impregnate a layered body in the molding die shown in FIG. 3.

In this configuration, the resin injected from the resin filling port 2 diffuses through the bottom face side resin diffusion medium 3 and the top face side resin diffusion medium 5 as indicated by arrows 10 and 12 in FIG. 4 while impregnating the layered body in its thickness direction as indicated by arrows 11 and 13.

In the example of the molding die shown in FIG. 3, that is, the molding die M1, the resin suction medium 7a is located in the central region of the side face formed by the thickness of the layered body and, accordingly, the resin supplied through the resin diffusion mediums 3 and 5 moves for impregnation first in the thickness direction of the layered body 4 and then in the direction indicated by the arrows 14 (in-plane direction) as it is aspirated by the resin suction medium 7a, thereby impregnating that a part of the layered body 4 corresponding to the portion where the resin diffusion medium layers 3 and 5 do not exist (the portion Y free from the resin diffusion medium) to significantly depress the formation of resin-un-impregnated portions.

In the case of a layered body comprising reinforcing fiber base materials of the same material and in a layered configuration symmetric in the thickness direction, flows of resin that impregnate the layered body in its thickness direction join together at the through-thickness center of the layered body 4 (confluence of resin flows denoted by the arrows 11 and 13) and, accordingly, it is preferable that the resin-aspiratable portion of the resin suction medium 7a is at the through-thickness center of the layered body 4.

On the other hand, in the case of a layered body comprising a plurality of kinds of reinforcing fiber base materials different in, for instance, material type, weight per unit area and weave structure of reinforcing fibers used and in a layered configuration asymmetric in the thickness direction, the resin impregnation rate in the thickness direction depends on impregnatability of the reinforcing fiber base materials that constitute the layered body and tends to differ among them and, as a result, the flows of resin injected into the layered body do not necessarily join together at the through-thickness center of the layered body.

In the case of such an asymmetric body, therefore, it is preferable that the position of the resin-aspiratable portion of the resin suction medium 7a is fixed based on investigations such as test of layered body impregnation with resin to determine the confluence where injected resin flows join together. Alternately, it is also preferable that the position of confluence of resin flows is determined from analysis data such as impregnation calculations and FEM (finite element method) based impregnation simulation, and the position of the resin-aspiratable portion of the resin suction medium 7a is fixed so that it contains the interlayer position where the resin flows join together.

In the molding die M1, furthermore, the resin suction medium 7a is covered with the airtight material 17 except for the portion used to aspirate the layered body 4, and this acts to prevent formation of shortcuts (shortcuts denoted by arrows 15) that allow the resin injected through the resin diffusion mediums 3 and 5 to be aspirated by the resin suction medium 7a before impregnating the layered body 4, thus effectively depressing formation of resin-unimpregnated portions in the layered body 4.

The airtight material provided on the surface of the resin suction medium 7a located on the inner face of the bagging film 8 extends toward the resin suction port 6 along the resin suction medium 7a, then covers the resin suction port 6, and reaches the edge of the bottom mold, while a sealer 9a is provided between the peripheral edge of the bottom face of this airtight material and the peripheral edge of the top face of the bottom mold 1 to hold the airtight material and the bottom mold 1 airtight.

On the other hand, the airtight material provided on the opposite surface to the surface of the resin suction medium 7a located on the inner face of the bagging film 8 extends toward the resin suction port 6 along the resin suction medium 7a, then passes under the resin suction port 6, and reaches the edge of the bottom mold 1, while a sealer 9b is provided between the peripheral edge of the bottom face of this airtight material and the peripheral edge of the top face of the bottom mold to hold the airtight material and the bottom mold 1 airtight.

As a result, the top face of the resin suction medium 7a located at the resin suction port 6 is open to the resin suction port 6 to allow gas and resin to pass, while the bottom face of the resin suction medium 7a located at the resin suction port 6 is closed with an airtight material to prevent gas and resin from passing to or from the exterior.

In the molding die M1, furthermore, even if the layered body has been completely impregnated in the thickness direction with a resin in the portion provided with the resin diffusion medium, aspiration of the resin by the resin suction medium 7a will not start immediately if the portion Y free from the resin diffusion medium is not impregnated with the resin.

In particular, even if formation of unexpected resin unimpregnated portions takes place in the layered body during resin injection and impregnation, the portion Y free from the resin diffusion medium ensures an adequate duration until the start of resin aspiration, allowing aspiration by the resin suction medium to start after the resin has impregnated the unimpregnated portions.

In short, variations in quality characteristics such as impregnatability and thickness in the thickness direction of the reinforcing fiber base materials cause variations in the impregnation time in the thickness direction in the layered body and, accordingly, impregnation of the layered body does not necessarily proceed continuously after starting near the resin filling port 2. Therefore, it is possible for the resin to be aspirated and removed after reaching the resin suction medium 7a while some resin-unimpregnated potions are still left in the interior of the layered body.

If the portion Y free from the resin diffusion medium is provided, the flows of resin that have moved through the resin diffusion mediums 3 and 5, impregnated the layered body in its thickness direction and joined together, subsequently move in the in-plane direction through a distance equal to the length of the portion Y free from the resin diffusion medium before being aspirated by the resin suction medium 7a. Thus, if resin-unimpregnated potions occur unexpectedly after the flows of resin have joined together, resin impregnation of the resin-unimpregnated potions can be completed during the duration before the flows of resin reach the resin suction medium 7a after joining together.

Figure 5:
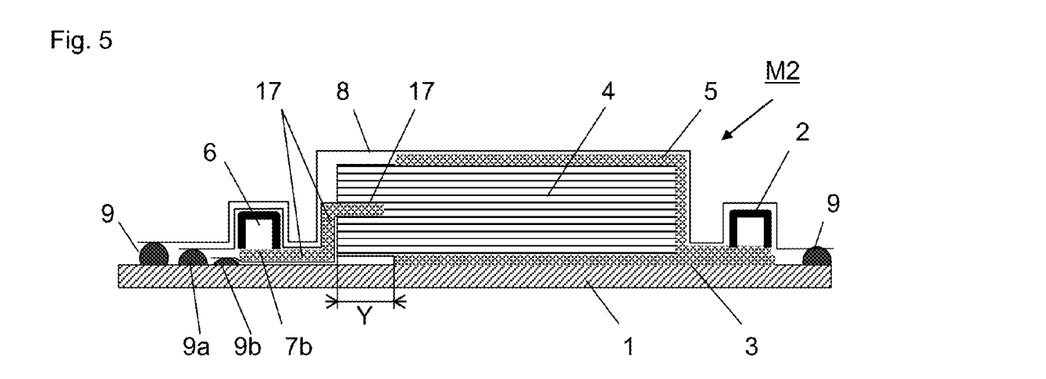
FIG. 5 is a schematic vertical section diagram of another example of the molding die for practicing our method of producing a fiber-reinforced plastic using an RTM process.

Next, another example of our method of producing a fiber-reinforced plastic which uses a molding die M2 different from the molding die M1 illustrated in FIG. 3, is described below with reference to FIGS. 5 and 6. In FIG. 5, the members common to FIG. 3 have the same numbers.

FIG. 5 is a schematic vertical section diagram of a molding die PM2 which is another example molding die designed to carry out our RTM-based fiber-reinforced plastic production method. The molding die M2 shown in FIG. 5 and the molding die M1 shown in FIG. 3 differ in the arrangement of the resin suction medium provided along the side face near the resin suction port 6 in the layered body 4.

Specifically, in the molding die M2, the end portion of the resin suction medium 7b extending upward along the side face of the layered body 4 bends on the side face of the layered body 4 and enters between reinforcing fiber base materials in the layered body. The arrangement of the resin suction medium is different in this point between the molding die M2 and the molding die M1.

Figure 6:
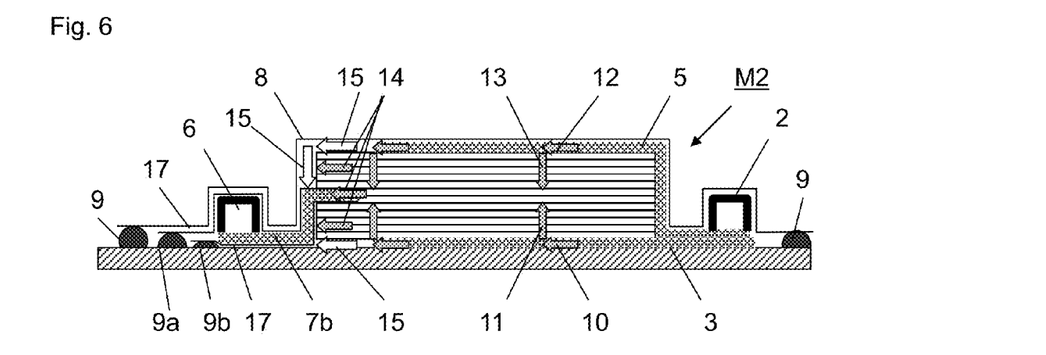
FIG. 6 is a schematic diagram outlining the step of injection of resin to impregnate a layered body in the molding die shown in FIG. 5.

In the molding die M2 in which the resin suction medium 7b is arranged as described above, the resin injected from the resin filling port 2 diffuses through the lower side resin diffusion medium (resin diffusion medium (bottom)) 3 and the top face side resin diffusion medium (resin diffusion medium (top)) 5 as indicated by arrows 10 and 12 in FIG. 6, and starts to impregnate the layered body 4 in its thickness direction as indicated by arrows 11 and 13.

In the molding die M2, that end portion of the resin suction medium 7b opposite to the end near the resin suction port 6 is inserted between reinforcing fiber base materials in the layered body 4 and, accordingly, the resin supplied through the resin diffusion mediums 3 and 5 moves for impregnation first in the thickness direction of the layered body 4 and then in the direction indicated by arrows 14 as it is aspirated by the resin suction medium 7b, thereby impregnating that a part of the layered body 4 corresponding to the portion where the resin diffusion mediums 3 and 5 do not exist, i.e., the portion Y free from the resin diffusion medium, to significantly depress formation of resin-unimpregnated portions.

The portion Y free from the resin diffusion medium in the molding die M2 illustrated in FIG. 5 has the same function as the portion Y free from the resin diffusion medium in the molding die M1 illustrated in FIG. 3. Thus, even in those portions where the resin suction medium 7b is not inserted between reinforcing fiber base materials, the resin has adequate time to impregnate the layered body completely before being aspirated by the resin suction medium 7b. Even if unexpected formation of resin unimpregnated portions takes place during resin injection and impregnation, existence of the portion Y free from the resin diffusion medium serves to ensure an adequate duration until the start of resin aspiration, allowing the resin to impregnate unimpregnated portions during this duration and, finally, the resin is aspirated to the resin suction port 6 through the resin suction medium 7b after completion of resin impregnation.

In addition, an airtight material 17 covers those portions of the resin suction medium 7b that do not aspirate gas or resin out of the layered body 4. This depresses formation of short-cut paths denoted by arrows 15 that could act to allow the resin injected through the resin diffusion medium layers 3 and 5 to be aspirated by the resin suction medium 7b before impregnating the layered body 4. This airtight material 17 is also helpful to significantly depress formation of resin-unimpregnated portions.

There are no specific limitations on the material of the airtight material 17 as long as it can serve to maintain airtightness, but in particular, it is preferably the same as the material of the bagging film. As seen in FIG. 5, the airtight material 17 is provided on the top face of the resin suction medium 7b to cover the resin suction port (the resin aspiration port) 6, and the sealer 9a is provided to maintain airtight contact with the bottom mold 1, serving to prevent direct aspiration of resin by the resin suction medium 7b even if the resin diffused from top face side resin diffusion medium 5 in an unexpected way forms shortcut paths as indicated by arrows 15 in FIG. 6. The resin is aspirated by the resin suction medium 7b only after the layered body 4 has been impregnated in the thickness direction, leading to an increase in the degree of resin impregnation of the layered body 4.

Similarly, the airtight material 17 is provided on the bottom face of the resin suction medium 7b, and a sealer 9b is provided to maintain airtight contact with the bottom mold 1, serving to prevent direct aspiration of resin by the resin suction medium 7b even if the resin diffused through the bottom face side resin diffusion medium 3 in an unexpected way forms shortcut paths as indicated by arrows 15 in FIG. 6. The resin is aspirated by the resin suction medium 7b only after the layered body 4 has been impregnated in the thickness direction, leading to an increase in the degree of resin impregnation of the layered body 4.

When the molding die M2 based fiber-reinforced plastic production method shown in FIG. 5 is applied, the resulting layered body in its entirety cannot be used as a fiber-reinforced plastic product because part of the resin suction medium 7b remains in the interior of the layered body after curing of the resin. In the molding die M2 based fiber-reinforced plastic production method shown in FIG. 5, however, the resin suction medium 7b can be set easily on the side face of the layered body as the layered body is placed in the interior space of the molding die, leading to the advantage of a shortened production cycle time, as compared with the molding die M1 based fiber-reinforced plastic production method.

Example 1

Carbon fiber base materials were used as reinforcing fiber base materials. It contained carbon fibers (T620SC-24000 carbon fiber supplied by Toray Industries, Inc.) arranged in the same direction and had a carbon fiber weight per unit area of 600 g/m². To prepare a layered body, 50 of these carbon fiber base materials were stacked and fibers were paralleled in one direction.

This layered body was put on the bottom mold 1 of the molding die M1 as shown in FIG. 3.

The same polypropylene mesh sheets having a mesh size of 2.5 mm and a thickness of about 0.6 mm were used as the top face side resin diffusion medium 5, the bottom face side resin diffusion medium 3, and the resin suction medium 7a.

The top face side resin diffusion medium 3 and the bottom face side resin diffusion medium 5 were located so that the portion Y free from the resin diffusion medium shown in FIG. 3 had a length of 10 mm in the length direction of the layered body 4.

The resin suction medium 7a was provided over the entire length of the side face (side wall SW) formed by the thickness of the layered body 4 such that it came into contact with the through-thickness center portion of the side face formed by the thickness of the layered body 4 as seen in FIG. 3. The resin suction medium 7a was provided with a sealing-fixing material 16 at two positions located above and below this center portion such that the portion X where it was in direct contact with the side face formed by the thickness of the layered body 4 measures 5 mm.

As shown in FIG. 3, furthermore, the airtight material 17 was provided on both faces of the resin suction medium 7a and the sealers 9a and 9b were used to maintain airtight contact with the bottom mold 1 of the molding die M1. The airtight material 17 used was a polyamide bagging film having a thickness of about 50 μm.

Furthermore, aluminum channels having a width and height of 15 mm were used to produce the resin filling port 2 and the resin suction port (vacuum aspiration port) 6. As shown in FIG. 3, the resin filling port 2 was located on the top face side resin diffusion medium 5 and the bottom face side resin diffusion medium 3, while the resin suction port (vacuum aspiration port) 6 was located on the resin suction medium 7a. Subsequently, a polyamide tube having an outside diameter of 12 mm and an inside diameter 9 mm (not shown in the figure) was inserted in the resin filling port 2 and the resin suction port 6.

In addition, the entire assembly was covered with the bagging film 8, and the sealer 9 was used to close the gap with the bottom mold 1 of the molding die M1. The same sealer material was used as the sealer 9 and the sealing-fixing material 16.

While the polyamide tube inserted in the resin filling port 2 was closed, the polyamide tube inserted in resin suction port (vacuum aspiration port) 6 was connected to a vacuum pump (not shown in the figure) and the interior space in the molding die M1 closed airtightly by the bagging film 8 was subjected to pressure reduction by vacuum aspiration. The layered body 4 in this state had a thickness T of about 30 mm.

While maintaining the interior of the bagging film 8 at a reduced pressure by vacuum aspiration, a liquid state epoxy resin was injected by atmospheric pressure through the polyamide tube inserted in the resin filling port 2 so that the resin would diffuse and impregnate the layered body 4 by the top face side resin diffusion medium 5 and the bottom face side resin diffusion medium 3.

The epoxy resin consisted of two components, i.e., base resin and curing agent, and with respect to the viscosity, the resin had an initial viscosity of about 160 mPas, which tended to increase about two-fold in 60 min.

As a result, the resin injected into the layered body 4 was found to bleed out into the resin suction medium 7a about 20 min after the start of injection. It was assumed that this bleed-out of resin indicates the completion of resin impregnation of the layered body 4, and the resin suction port (vacuum aspiration port) 6 was closed to stop vacuum aspiration, followed by closing the resin filling port 2 to stop resin injection.

With the resin filling port 2 and the resin suction port (vacuum aspiration port) 6 closed, the layered body 4 impregnated with the resin was left at room temperature for 24 hours and heated in an oven at 60° C. for 15 hours to cure the resin. After the resin was cured completely, a molded product produced in the molding die M1 was removed out of the molding die M1.

A fiber-reinforced plastic molding thus produced was cut along its entire length at the widthwise center, and the section was observed, showing that there was no resin-unimpregnated portion.

Example 2

Figure 7:
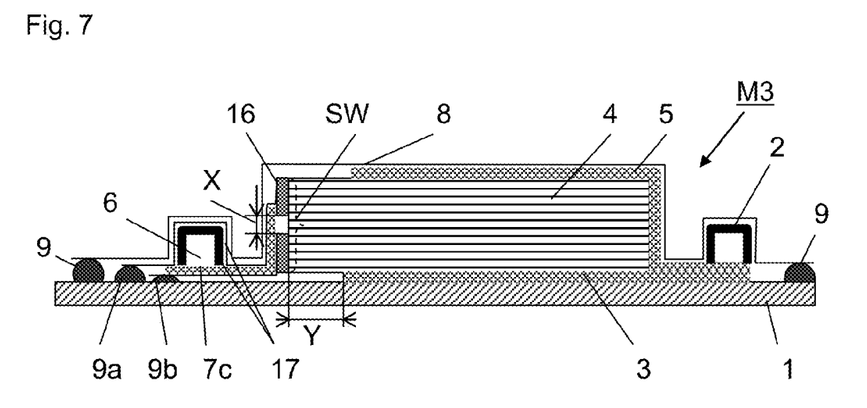
FIG. 7 is a schematic vertical section diagram of another example of the molding die for practicing our method of producing a fiber-reinforced plastic using an RTM process.

FIG. 7 is a schematic vertical section diagram of a molding die M3 which is another example molding die designed to carry out our RTM-based fiber-reinforced plastic production method.

A molding die M3 shown in FIG. 7 and the molding die M1 shown in FIG. 3 differ as follows: in the former molding die M3, a sealing-fixing material 16, as compared with the latter molding die M1, is provided over the entire side face of the layered body; an aperture (window) is provided in the vertical center portion of the sealing-fixing material 16, and a resin suction medium 7c that has an airtight material on both faces is provided along the surface (external surface) of the sealing-fixing material 16 opposite to the other surface in contact with the side face of the layered body 4.

The resin suction medium 7c has both sides covered with an airtight material 17, and the airtight material 17 had a similar aperture (window) at a position that faces the aperture (window) in the sealing-fixing material 16. A resin injected into the layered body 4 is aspirated by the resin suction medium 7c through the aperture (window) in the sealing-fixing material 16 and the aperture (window) in the airtight material 17.

Using the molding die M3 shown in FIG. 7, a fiber-reinforced plastic molding was produced by the same procedure as in Example 1.

The molding thus produced was cut as in Example 1, and the section was observed, showing that there was no resin-unimpregnated portion in the molding.

Comparative Example 1

Using the molding die PM1 shown in FIG. 1, a fiber-reinforced plastic molding was produced by the same procedure as in Example 1.

The molding thus produced was cut as in Example 1, and the section was observed, showing that resin-unimpregnated portions were left over a large area extending from the through-thickness center of the layered body 4 to a position near the bottom face of the layered body 4 that faces the bottom face side resin diffusion medium 3.

The invention claimed is:

1. A method of producing a fiber-reinforced plastic comprising:
    (a) preparing a molding die having a resin filling port at one end portion thereof and a resin suction port at the other end portion thereof,
    (b) setting a layered body comprising a stack of a plurality of reinforcing fiber base materials in an inner space of the molding die,
    (c) setting a resin diffusion medium which extends from the resin filling port and is provided along two mutually opposed surfaces of the layered body to supply a resin from the resin filling port to the two mutually opposed surfaces of the layered body,
    (d) setting a resin suction medium which extends from the resin suction port and is provided only along a side face of the layered body on the suction port side to be in contact with the side face in a state that gas or resin can be sucked from the layered body so that the gas or resin can be moved from the layered body toward the resin suction port,
    (e) sucking gas in the inner space of the molding die from the resin suction port through the resin suction medium to reduce pressure in the inner space of the molding die,
    (f) subsequently introducing the resin into the layered body from the resin filling port through the resin diffusion medium, and
    (g) impregnating the layered body with the resin by moving a part of the resin filled into the layered body toward the resin suction port through the resin suction medium.

2. The method according to claim 1, wherein the resin suction medium faces on a side face of the layered body that includes reinforcing fiber base materials located at a confluence region of flows of the resin impregnating into the layered body from the two mutually opposed surfaces of the layered body.

3. The method according to claim 1, wherein the resin suction medium faces on a side face of the layered body that includes reinforcing fiber base materials located at a thickness center portion of the layered body.

4. The method according to claim 1, wherein the resin suction medium is fixed to the molding die with a sealing-fixing material at a position between the inner face of the molding die and the side face of the layered body.

5. The method according to claim 1, wherein the resin diffusion medium extending from the resin filling port does not reach a position of the side face of the layered body in which the resin suction medium is provided so that a region free from the resin diffusion medium is formed between the inner face of the molding die and the surface of the layered body.

6. The method according to claim 1, wherein the resin suction medium has a portion located outside a region through which the resin is sucked and the portion is covered with an airtight material to protect against suction of the resin.

7. The method according to claim 1, wherein resin flow resistance of the resin diffusion medium is $1/10$ or less than $1/10$ of resin flow resistance of the reinforcing fiber base materials.

8. The method according to claim 1, wherein resin flow resistance of the resin suction medium is $1/3$ or less than $1/3$ of resin flow resistance of the reinforcing fiber base materials.

9. The method according to claim 1, wherein at least a part of the resin suction medium is removed from a molded fiber-reinforced plastic.

10. The method according to claim 1, wherein the reinforcing fiber base materials forming the layered body comprise reinforcing fibers arranged in the same direction.

11. A method of producing a fiber-reinforced plastic comprising:
    (a) preparing a molding die having a resin filling port at one end portion thereof and a resin suction port at the other end portion thereof,
    (b) setting a layered body comprising a stack of a plurality of reinforcing fiber base materials in an inner space of the molding die,
    (c) setting a resin diffusion medium which extends from the resin filling port and is provided along two mutually opposed surfaces of the layered body to supply a resin from the resin filling port to the two mutually opposed surfaces of the layered body,
    (d) setting a resin suction medium which extends from the resin suction port and is provided along a side face of the layered body on the suction port side to be in contact with the side face or to have a gap from the side face, in a state that gas or resin can be sucked from the layered body so that the gas or resin can be moved from the layered body toward the resin suction port,
    (e) sucking gas in the inner space of the molding die from the resin suction port through the resin suction medium to reduce pressure in the inner space of the molding die,
    (f) subsequently introducing the resin into the layered body from the resin filling port through the resin diffusion medium, and
    (g) impregnating the layered body with the resin by moving a part of the resin filled into the layered body toward the resin suction port through the resin suction medium,
    wherein the resin suction medium is fixed to the molding die with a sealing-fixing material at a position between the inner face of the molding die and the side face of the layered body, and
    wherein the sealing-fixing material has a height substantially equal to thickness of the layered body and has a resin aspiration port having a height of 0.1 to 5 mm and a width of 0.1 to 50 mm at a position corresponding to the thickness center portion of the layered body.

* * * * *